United States Patent Office 2,713,551
Patented July 19, 1955

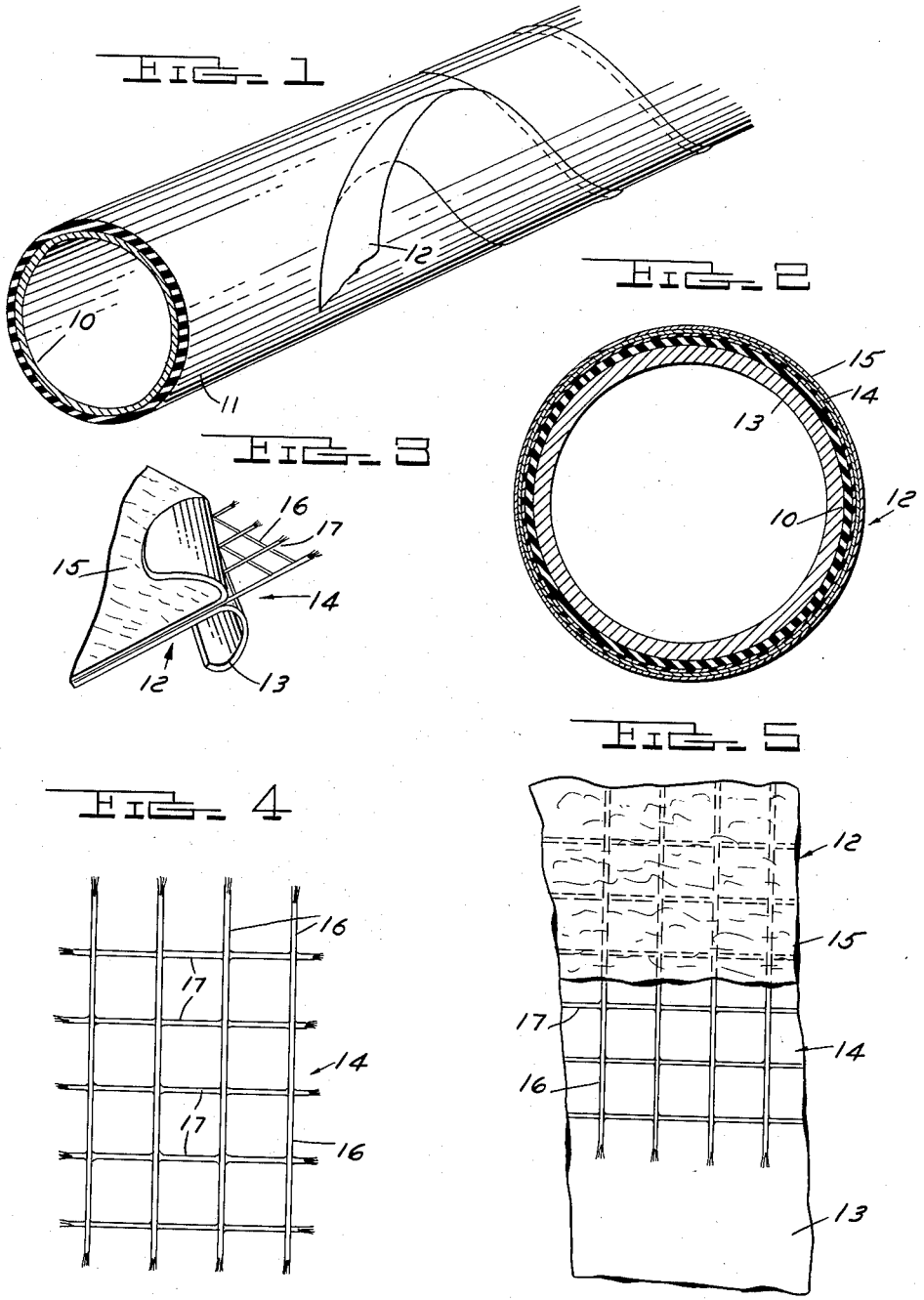

2,713,551

REINFORCED COVERING FOR PIPES

Ted Kennedy, Ann Arbor, Mich., assignor to The Trenton Corporation, Ann Arbor, Mich., a corporation of Michigan Application November 19, 1951, Serial No. 257,096

3 Claims. (Cl. 154—52)

This invention relates generally to pipe coverings and refers more particularly to improvements in protective coverings for pipe adapted to be buried in the soil.

One of the objects of this invention is to provide a pipe covering which effectively protects a buried length of pipe against corrosion and the effects of soil stress. More particularly the present invention concerns itself with a wrapping or covering capable of being applied directly on the pipe or on the noncorrodible material usually applied on the outer surface of the pipe prior to or during laying the pipe in the soil. The noncorrodible material is of a nature to protect the pipe against attack by the soil of a chemical nature, but does not satisfactorily protect the pipe against the destructive effects of soil stress. The wrapping or covering forming the subject matter of this invention, when used in conjunction with a noncorrodible coating of the above type, not only protects the coating from mechanical injury due to soil stress, but in addition, greatly assists the coating in resisting any possibility of the soil chemically attacking the pipe.

More specifically the present invention contemplates an improved pipe covering in the form of a strip sufficiently flexible to enable spirally wrapping the same around a length of pipe with or without a noncorrodible coating thereon either prior to or during laying of the pipe into the soil.

It is another object of this invention to provide a pipe covering of the above general type reinforced to possess the required tensile strength to enable tightly wrapping the covering around the pipe, and also possessing dielectric characteristics to prevent stray electrical currents in the soil from reaching the pipe.

It is a further object of the invention to provide a protective pipe wrapping or covering embodying a material which lends itself to heat sealing the overlying edges of adjacent convolutions of the covering together throughout the length of said edges whereby the wrapping affords a continuous sealed cover for the pipe.

It is a still further object of this invention to provide a protective pipe wrapping or covering also having an exterior surface composed of a cushioning material of a nature to protect the pipe covering from damage during back filling and the like.

The foregoing as well as other objects will be made more apparent as this description proceeds, especially when considered in connection with the accompanying drawing, wherein:

Figure 1 is a perspective view of a length of pipe having a protective covering embodying the features of this invention;

Figure 2 is a cross sectional view on a somewhat exaggerated scale through a pipe covered in accordance with the present invention;

Figure 3 is a fragmentary perspective view of the laminated wrapping on the pipe and showing portions of the laminations separated for the sake of clearness;

Figure 4 is a fragmentary plan view of one of the laminations shown in Figure 3; and Figure 5 is a fragmentary plan view of the laminated wrapping.

Although it is possible to apply the wrapping or coating forming the subject matter of the present invention directly to the outer surface of a length of pipe or conduit, nevertheless, particularly satisfactory results have been obtained where the coating or wrapping is applied to a length of pipe or conduit which has previously been coated with a noncorrodible material; and hence, this particular application of the invention is selected herein for the purpose of illustration. With this in view reference is made more in detail to the drawing, wherein it will be noted that the numeral 10 designates a length of pipe formed of a material requiring protection from the elements, and the numeral 11 indicates a relatively thick coating surrounding the outer surface of the pipe 10. The coating 11 may be any one of a number of noncorrodible heat softenable materials, such for example as bituminous compounds or any one of the various inhibited wax compounds embodying rust preventives. Such compounds or their equivalent are especially applicable in instances where the length of pipe is to be buried in the soil.

Corrosive resistant compounds of the above general type are usually applied directly to the outer surface of a length of pipe either before or during laying of the pipe in the soil. In any case the compound is in a molten or semimolten state when applied to the pipe so that it closely conforms to the outer surface of the pipe and adheres to this surface when allowed to set.

In accordance with the present invention the action of the coating 11 in protecting the length of pipe 10 is supplemented by a covering or wrapping 12 in the form of a strip or ribbon composed of a number of laminations bonded together to provide an integral unit. In the present instance the strip 12 is shown as having three laminations indicated in the drawing by the numerals 13, 14 and 15. The lamination 13 comprises a plastic film, and particularly satisfactory results are obtained by the use of a polyethylene film, although other resins may be used, such for example as vinylidene chloride, polyvinylidene chloride, nylon resins and nylon containing a vinyl film. A polyethylene film is preferred because this material is relatively inexpensive to produce in thin sheets and because it possesses many characteristics which are highly advantageous in the present application. As an example a polyethylene film has negligible water absorption, exceptional dielectric qualities, is permeable to gases, has low water-vapor transmission, is capable of being readily heat-sealed, is chemically inert at normal temperatures, is exceptionally tough and has excellent aging characteristics particularly when shielded from ultraviolet light. Moreover polyethylene films have outstanding low temperature flexibility, and may be calendered at temperatures in the range of 220° F. to 300° F.

The lamination 14 serves as a reinforcement for the plastic film lamination 13, and comprises fibers having exceptionally high tensile strength. The fibers are preferably grouped into strands, or yarns indicated in Figure 4 of the drawing by the numerals 16 and 17. The strands of fibers 16 extend lengthwise of the lamination 14, and are spaced from each other transversely of this lamination. The strands or yarns 17 extend crosswise of the lamination 14 and are spaced from each other in the direction of length of this lamination. Also one or both series of strands are coated with a resin and are bonded together at the points of crossing. Although various organic and/or inorganic fibers may be employed, it is preferred to use glass fibers, since such fibers are moisture resistant and possess exceptionally high tensile strength. In any case the strands of fibers are arranged to substantially increase the tensile strength of the strip 12 in directions extending transversely to each other, and hence render it possible to tightly wrap the strip 12 around the pipe 10.

The lamination 15 comprises a material possessing relatively high cushioning qualities, and is resistant to chemicals in the soil. Many different types of materials are available to the fabricator for use in producing the lamination 15. Materials containing chemically resistant fibers, such for example as asbestos felt are especially desirable. Where asbestos felt or similar types of fabric are employed, it is preferred to waterproof the same by incorporating an emulsified wax in the felt during manufacture. Any one of a number of petroleum types of water-soluble waxes may be employed to impregnate the lamination 15 during fabrication of the latter.

The three laminations described above are permanently bonded together to form the integral strip 12, and this may be accomplished by passing the laminations in superposed relationship between calender rolls at elevated temperatures. In cases where the plastic lamination 13 comprises a polyethylene film, the laminations are calendered at a temperature in the range of 220° F. to 300° F.

The laminated strip 12 formed in accordance with the above is highly flexible and enables readily wrapping the same spirally around the length of pipe 10. In wrapping the strip 12 around the length of pipe 10, the lamination 15 is positioned to form the outer surface of the length of pipe, and the lamination 13 is positioned in engagement with the coating 11. The fibers of the reinforcing lamination 14 greatly increase the tensile strength of the laminated strip 12 and render it possible to tightly wrap the strip around the length of pipe. Also the strip 12 is wrapped around the length of pipe in a manner such that the marginal edges of adjacent convolutions of the strip 12 overlie one another, and these edges are heat sealed throughout their length so that the strip 12 provides a continuous seal around the length of pipe. Inasmuch as the cushioning lamination 15 forms the outer surface of the length of pipe, it follows that this lamination protects the pipe as well as the material enclosed by the lamination 15 from damage due to handling of the length of pipe or due to back failing after the pipe is laid in the soil. It will of course be understood that the lamination 15 cooperates with the laminations 13 and 14 to thoroughly protect the coating 11 from soil stresses, and in addition cooperates with the coating 11 to protect the pipe against damage by chemical reactions.

In instances where the strip 12 is wrapped around the pipe or covering 11 immediately after the covering 11 is applied to the pipe, the residual heat in the coating 11 is sufficient to effectively heat seal the overlying edge portions of the plastic lamination 13 together and thereby provide the continuous sealed enclosure for the pipe previously described. Consequently the application of the protective strip 12 to the coating 11 or length of pipe 10 may be accomplished without appreciably increasing the cost of installation and without material increase in time required to apply the coating.

What I claim as my invention is:

1. A reinforced covering for pipes comprising a flexible laminated strip adapted to be wrapped around a length of pipe, said strip having a first lamination constituting an exposed side of said strip and comprising a tough, flexible polyethylene film, a second lamination comprising flexible glass fibers of high tensile strength arranged in spaced strands and fused directly to the first lamination to reinforce the latter and thereby enable the strip to be wrapped tightly around a length of pipe, and a third lamination of asbestos felt constituting the opposite exposed side of said strip and applied over the second lamination in surface to surface relation thereto, said third lamination being heat-sealed directly to said first lamination at the spaces between the glass fiber strands of the second lamination and being effective to protect the length of pipe from mechanical injury due to soil stress and the like, said asbestos felt being impregnated with an emulsified wax to waterproof the same.

2. A reinforced covering for pipes comprising a flexible laminated strip adapted to be wrapped around a length of pipe, said strip having a first lamination constituting an exposed side of said strip and comprising a tough, flexible polyethylene film, a second lamination comprising flexible glass fibers of high tensile strength arranged in spaced strands and fused directly to the first lamination to reinforce the latter and thereby enable the strip to be wrapped tightly around a length of pipe, said glass fiber strands being grouped into a first series of strands extending lengthwise of the strip and a second series of strands arranged in crossing relation to the first series, the strands of at least one of said series of strands being coated with a resin for bonding said strands together at the points of crossing, and a third lamination of asbestos felt constituting the opposite exposed side of said strip and applied over the second lamination in surface to surface relation thereto, said third lamination being heat-sealed directly to said first lamination at the spaces between the glass fiber strands of the second lamination and being effective to protect the length of pipe from mechanical injury due to soil stress and the like, said asbestos felt being impregnated with an emulsified wax to waterproof the same.

3. A reinforced covering for pipes comprising a flexible laminated strip adapted to be wrapped around a length of pipe, said strip having a first lamination constituting an exposed side of said strip and comprising a tough, flexible polyethylene film, a second lamination comprising flexible glass fibers of high tensile strength arranged in spaced strands and fused directly to the first lamination to reinforce the latter and thereby enable the strip to be wrapped tightly around a length of pipe, said glass fiber strands being grouped into a first series of strands extending lengthwise of the strip and a second series of strands arranged in crossing relation to the first series, the strands of at least one of said series of strands being coated with a resin for bonding said strands together at the points of crossing, and a third lamination of asbestos felt constituting the opposite exposed side of said strip and applied over the second lamination in surface to surface relation thereto, said third lamination being heat-sealed directly to said first lamination at the spaces between the glass fiber strands of the second lamination and being effective to protect the length of pipe from mechanical injury due to soil stress and the like, said asbestos felt being impregnated with an emulsified wax to waterproof the same, and said laminated strip being helically wound around the pipe in overlapping convolutions and arranged with the first lamination disposed adjacent to the pipe and having the adjacent edges of the overlapping convolutions heat-sealed together.

References Cited in the file of this patent

UNITED STATES PATENTS

| Number | Name | Date |
|---|---|---|
| 2,045,103 | Rosch | June 23, 1936 |
| 2,311,573 | Shoan | Feb. 16, 1943 |
| 2,332,373 | Dorough et al. | Oct. 19, 1943 |
| 2,360,109 | Converse | Oct. 10, 1944 |
| 2,377,317 | Blume | June 5, 1945 |
| 2,401,314 | Quinn | June 4, 1946 |
| 2,436,421 | Cork | Feb. 24, 1948 |
| 2,523,022 | Horstman | Sept. 19, 1950 |
| 2,525,070 | Greenwald et al. | Oct. 10, 1950 |
| 2,582,037 | Hyde | Jan. 8, 1952 |
| 2,598,090 | Yung et al. | May 27, 1952 |
| 2,642,370 | Parsons | June 16, 1953 |